United States Patent
Miyamae

(10) Patent No.: US 8,229,995 B2
(45) Date of Patent: Jul. 24, 2012

(54) DATA TRANSFER PROCESSING APPARATUS, DATA TRANSFER PROCESSING METHOD, AND COMPUTER PRODUCT

(75) Inventor: Takeshi Miyamae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 12/353,838

(22) Filed: Jan. 14, 2009

(65) Prior Publication Data

US 2009/0292788 A1 Nov. 26, 2009

(30) Foreign Application Priority Data

May 26, 2008 (JP) ................................ 2008-136596

(51) Int. Cl.
*G06F 15/16* (2006.01)
(52) U.S. Cl. ........ 709/200; 709/209; 709/211; 711/170; 711/171; 711/172; 711/173
(58) Field of Classification Search .................. 709/200, 709/209, 211
See application file for complete search history.

(56) References Cited

U.S. PATENT DOCUMENTS

| 4,424,587 | A | * | 1/1984 | Wevelsiep et al. ............. 382/289 |
| 4,455,654 | A | * | 6/1984 | Bhaskar et al. .................. 714/28 |
| 4,665,509 | A | * | 5/1987 | Ooami et al. ............. 365/230.06 |
| 4,670,782 | A | * | 6/1987 | Harshbarger et al. ......... 348/183 |
| 4,797,815 | A | * | 1/1989 | Moore .......................... 710/109 |
| 5,440,547 | A | * | 8/1995 | Easki et al. ................ 370/395.3 |
| 5,465,163 | A | * | 11/1995 | Yoshihara et al. ............ 358/444 |
| 5,682,441 | A | * | 10/1997 | Ligtenberg et al. ........... 382/232 |
| 5,737,481 | A | * | 4/1998 | Gushima et al. ............. 386/263 |
| 5,933,655 | A | * | 8/1999 | Vrabec et al. ................... 710/60 |
| 6,081,665 | A | * | 6/2000 | Nilsen et al. .................. 717/116 |
| 6,094,398 | A | * | 7/2000 | Rieger ..................... 365/230.03 |
| 6,157,991 | A |   | 12/2000 | Arnon |
| 6,199,135 | B1 | * | 3/2001 | Maahs et al. .................. 710/305 |
| 6,298,322 | B1 | * | 10/2001 | Lindemann ................... 704/222 |

(Continued)

FOREIGN PATENT DOCUMENTS

JP 2003-517652 5/2003

(Continued)

OTHER PUBLICATIONS

Notice of Rejection cited by the Patent Office of Japan for corresponding JP Application No. 2008-136596, mailed May 29, 2012 (with English language translation).

*Primary Examiner* — Backhean Tiv
(74) *Attorney, Agent, or Firm* — Greer, Burns & Crain, Ltd.

(57) ABSTRACT

A computer-readable recording medium stores therein a data transfer processing program that causes a computer capable of accessing plural recording devices to acquire a group of update data for a first recording device among the recording devices and calculate, based on addresses respectively assigned to each data item in the group of update data, an overlap rate of the addresses. Further, based on the overlap rate calculated at the calculating, the computer selects a data transfer scheme from among a synchronous scheme of transmitting the group of update data simultaneously to the first recording device and a second recording device, and a nonsynchronous scheme of transmitting the group of update data to the first recording device and subsequently causing the first recording device to transmit the group of update data to the second recording device; and executes the data transfer scheme selected.

11 Claims, 10 Drawing Sheets

U.S. PATENT DOCUMENTS

| | | | |
|---|---|---|---|
| 6,304,497 B1 * | 10/2001 | Roohparvar | 365/189.04 |
| 6,327,591 B1 * | 12/2001 | Osborn et al. | 1/1 |
| RE37,930 E * | 12/2002 | Rieger | 365/230.03 |
| 6,490,657 B1 * | 12/2002 | Masubuchi et al. | 711/135 |
| 6,505,200 B1 * | 1/2003 | Ims et al. | 707/638 |
| 6,697,907 B1 * | 2/2004 | Roohparvar | 711/103 |
| 6,895,421 B1 * | 5/2005 | Dor et al. | 708/400 |
| 6,915,085 B2 * | 7/2005 | Kawaura | 399/8 |
| 6,944,168 B2 * | 9/2005 | Paatela et al. | 370/401 |
| 7,047,256 B2 * | 5/2006 | Miki et al. | 1/1 |
| 7,254,591 B2 * | 8/2007 | Ting et al. | 1/1 |
| 7,337,204 B2 * | 2/2008 | Dor et al. | 708/400 |
| 7,398,364 B2 | 7/2008 | Maruyama et al. | |
| 7,404,060 B2 * | 7/2008 | Hoshina | 711/170 |
| 7,565,351 B1 * | 7/2009 | Callaghan | 1/1 |
| 7,594,086 B2 * | 9/2009 | Arakawa et al. | 711/161 |
| 7,681,005 B1 * | 3/2010 | Mailloux et al. | 711/170 |
| 7,779,463 B2 * | 8/2010 | Stolfo et al. | 726/22 |
| 2002/0186661 A1 * | 12/2002 | Santiago et al. | 370/252 |
| 2004/0212729 A1 * | 10/2004 | Yamaguchi et al. | 348/387.1 |
| 2005/0177607 A1 * | 8/2005 | Dor et al. | 708/400 |
| 2006/0013235 A1 * | 1/2006 | Farnham | 370/401 |
| 2006/0217984 A1 * | 9/2006 | Lindemann | 704/268 |
| 2006/0259818 A1 * | 11/2006 | Howell et al. | 714/21 |
| 2006/0271815 A1 | 11/2006 | Mizuno et al. | |
| 2007/0200839 A1 * | 8/2007 | Sampsell | 345/204 |
| 2007/0251835 A1 * | 11/2007 | Mehta et al. | 205/783 |
| 2008/0282054 A1 * | 11/2008 | Isono | 711/206 |
| 2009/0021428 A1 * | 1/2009 | Young | 342/357.12 |
| 2009/0222163 A1 * | 9/2009 | Plante | 701/35 |
| 2009/0254721 A1 * | 10/2009 | Suzuki et al. | 711/162 |
| 2009/0292788 A1 * | 11/2009 | Miyamae | 709/211 |
| 2011/0238948 A1 * | 9/2011 | Vorbach et al. | 712/15 |

FOREIGN PATENT DOCUMENTS

| | | |
|---|---|---|
| JP | 2006-236019 | 9/2006 |
| JP | A 2006-338064 | 12/2006 |
| JP | 2007-066154 | 3/2007 |

\* cited by examiner

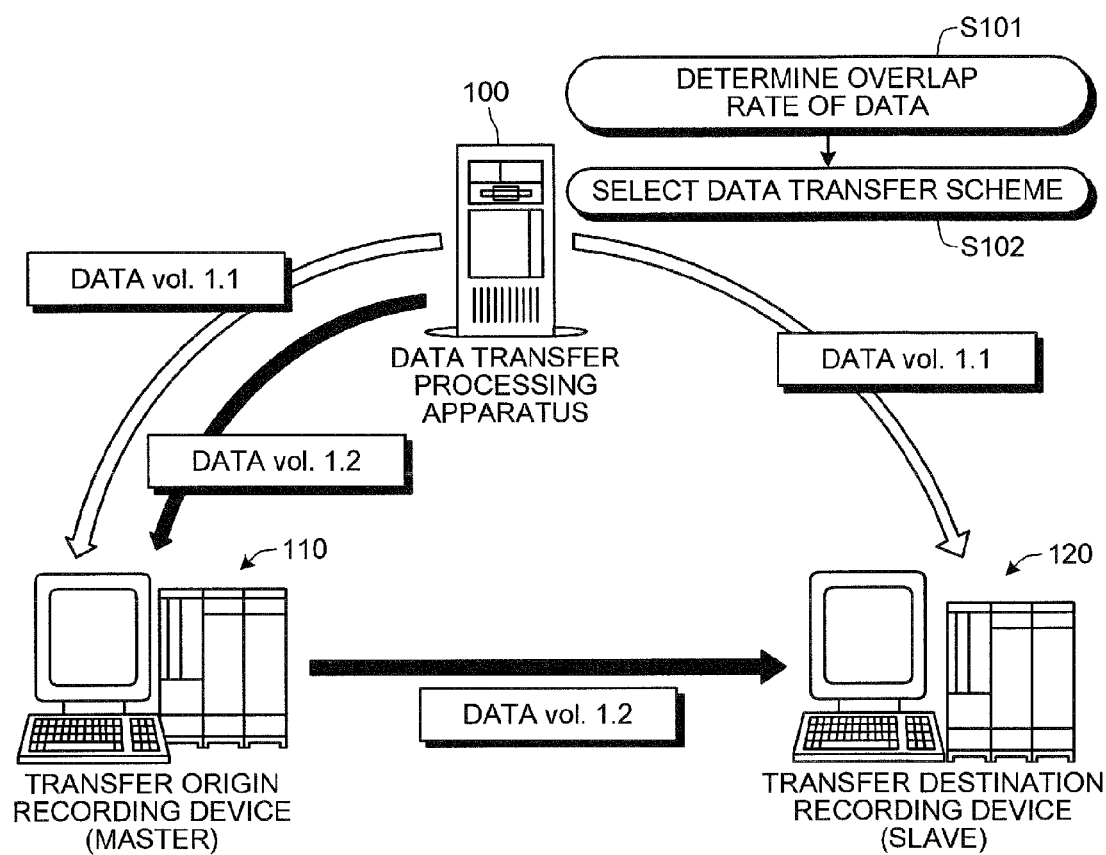

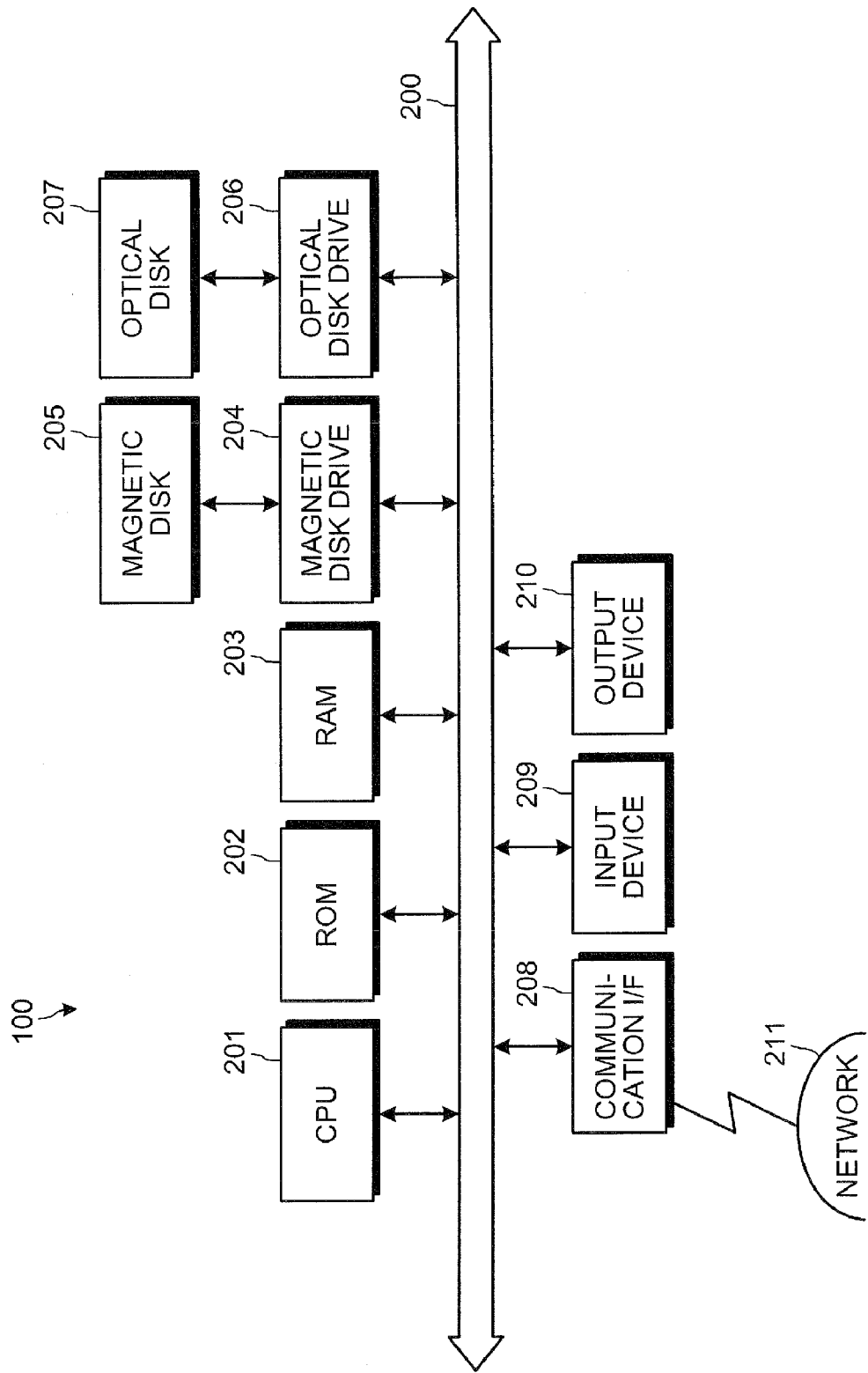

DATA TRANSFER PROCESSING APPARATUS, DATA TRANSFER PROCESSING METHOD, AND COMPUTER PRODUCT

CROSS REFERENCE TO RELATED APPLICATIONS

This application is based upon and claims the benefit of priority from the prior Japanese Patent Application No. 2008-136596, filed on May 26, 2008, the entire contents of which are incorporated herein by reference.

FIELD

The embodiments discussed herein are related to data transfer to a given memory area.

BACKGROUND

Conventionally, a data transfer processing technique has been provided for transferring data on-line from a given business-use server to a specific memory area without interruption of transactions. When plural memory areas are present as data transfer destinations in the execution of such data transfer, update data are transferred to respective memory areas by two types of schemes including a synchronous scheme (mirror scheme) and a nonsynchronous scheme (background copy scheme).

The synchronous scheme is performed such that during a transaction when data is updated in a memory area in which data updating is executed first, i.e., the memory area serving as a transfer origin, the same data updating is mirrored simultaneously in a memory area serving as a transfer destination. The nonsynchronous scheme is performed such that when data updating is executed in a memory area serving as a transfer origin, update-addresses in a bit-map format, etc., are stored temporarily on a primary memory, and at a given timing, the update is collectively mirrored in a memory area serving as a transfer destination.

The synchronous scheme and the nonsynchronous scheme each have advantages and disadvantages, and therefore need to be used separately for different purposes, depending on transfer conditions and the environment conditions of a transfer origin and a transfer destination. For example, the synchronous scheme has advantages of lighter load on a memory area used as a transfer origin and of immediate reflection of updated data in plural memory areas. The synchronous scheme, on the other hand, has disadvantages in that useless processing increases when the overlap rate of addresses of memories to be updated during the data updating is high, and that data updating may not be reflected correctly affecting transactions when the performance (capacity and access speed) of a memory area serving as a transfer destination is low.

The nonsynchronous scheme has advantages in that update data can be transferred efficiently even when the overlap rate of addresses is high as in the above case, and in that because data is transferred from a memory area serving as a transfer origin to the memory area serving as a transfer destination, a delay in reflecting the data update does not affect transactions even if the performance of a memory area serving as a transfer destination is low. The nonsynchronous scheme, on the other hand, has disadvantages in that load on the transfer origin memory area is heavy, and in that the speed of transferring update data may not match the updating speed. Hence, to transmit a group of update data, a transmission origin selects either the synchronous scheme or the nonscynchronous scheme depending on the contents of the group of update data at each data update, and performs data transfer processing.

According to conventional data transfer processing disclosed in Japanese Patent Application Laid-Open Publication No. 2006-338064, a system administrator, who executes data transfer processing taking into consideration the respective characteristics of the synchronous scheme and the nonsynchronous scheme, must select either of the schemes relying on intuition and experience. In database processing, a general tendency is for data in a group of update data to be written to respective addresses of different areas to lower the overlap rate. In file system processing, on the contrary, an overlap rate tends to be relatively higher. In practice, however, overlap rates vary depending on the contents of the data to be handled, thereby making a definite judgment on overlap rates difficult.

For example, in database processing, access is frequently made to specific metadata in some cases and therefore, the overlap rate of addresses of a group of update data may not be small. In file system processing, on the contrary, the overlap rate is not much larger when data is used mainly as a database table and updated in extensive file offsetting. In this manner, the expectation of a system administrator concerning an overlap rate may be extremely inaccurate even with consideration of general tendencies, thereby leading to a problem of an inefficient data transfer processing.

SUMMARY

According to an aspect of the invention, a computer-readable recording medium stores therein a data transfer processing program that causes a computer capable of accessing a plurality of recording devices to execute: acquiring a group of update data for a first recording device among the recording devices; calculating, based on addresses respectively assigned to each data item in the group of update data, an overlap rate of the addresses; selecting, based on the overlap rate calculated at the calculating, a data transfer scheme from among a synchronous scheme of transmitting the group of update data simultaneously to the first recording device and a second recording device, and a nonsynchronous scheme of transmitting the group of update data to the first recording device and subsequently causing the first recording device to transmit the group of update data to the second recording device; and executing the data transfer scheme selected at the selecting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic of the data transfer processing according to an embodiment;

FIG. 2 is a block diagram of a data transfer processing apparatus according to the embodiment;

DESCRIPTION OF EMBODIMENT(S)

Figure 3A:
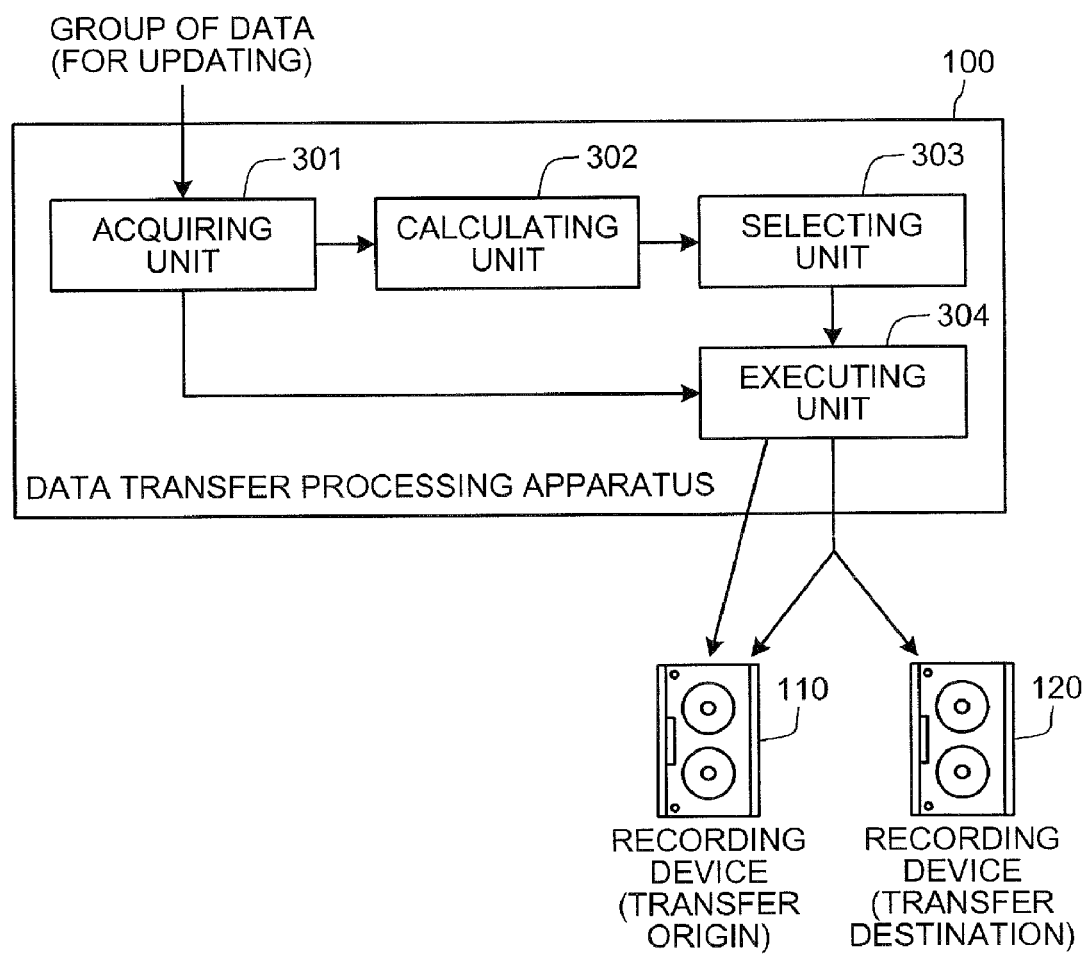
FIG. 3A is a functional diagram of a data transfer processing apparatus.

Preferred embodiments of the present invention will be explained with reference to the accompanying drawings.

In this present embodiment, when a group of update data is acquired, the addresses to which the group of data is to be written are referred to and a rate of overlap among the addresses is calculated as an overlap rate. Based on the calculated overlap rate, either a synchronous scheme or a nonsynchronous scheme is selected to execute data transfer processing.

FIG. 1 is a schematic of the data transfer processing according to the present embodiment. As depicted in FIG. 1, a data transfer processing apparatus 100 can access recording devices 110 and 120. When acquiring a group of update data, the data transfer processing apparatus 100 transfers the group of update data to the recording devices 110 and 120 serving as updating destinations. While two recording devices of the recording devices 110 and 120 are depicted in FIG. 1, the number of recording devices is not particularly limited. Two or more recording devices, therefore, may be provided.

When the data transfer processing apparatus 100 performs the data transfer processing, one of the recording devices 110 and 120 is determined to be a transfer origin (master) recording device. In the case depicted in FIG. 1, the recording devices 110 is determined to be the transfer origin (master) while the recording device 120 is determined to be a transfer destination (slave) in performing the process. Following setting of the transfer origin (master) and the transfer destination (slave), if the nonsynchronous scheme is selected, a group of update data is transferred preferentially to the transfer origin recording device 110. Specifically, the data transfer processing apparatus 100 updates the stored contents of the transfer origin (master) recording device 110, and then gives a data transfer instruction to the recording device 110 to mirror the updated contents of the recording device 110 on the recording device 120.

Similar to conventional data transfer processing, the data transfer processing above is performed by two types of schemes including the synchronous scheme and the nonsynchronous scheme. When acquiring a group of update data, the data transfer processing apparatus 100 of the embodiment automatically selects the optimum scheme from among the two schemes to execute the data transfer processing.

A specific procedure of the data transfer processing will be described with reference to FIG. 1. Upon acquiring a group of update data, the data transfer processing apparatus 100 determines the overlap rate of the group of data before data transfer (step S101). The data transfer processing apparatus 100 then selects a data transfer scheme according to the overlap rate determined at step S101 (step S102).

If the synchronous scheme is selected, the data transfer processing apparatus 100 transmits the group of update data directly to all recording devices whose data contents are to be updated (recording devices 101 and 102). In the case depicted in FIG. 1, a group of update data "data vol. 1.1" is determined to be data having a low overlap rate, which leads to a selection of the synchronous scheme. The data transfer processing apparatus 100, therefore, transmits "data vol. 1.1" directly to the recording devices 101 and 102, which update respectively stored contents by sequentially writing the "data vol. 1.1" transmitted thereto.

If the nonsynchronous scheme is selected, the data transfer processing apparatus 100 transmits a group of update data to the recording device 110 serving as the data transfer origin. Upon receiving the transmitted group of update data, the data transfer origin recording device 110 sequentially writes in the group of data to update the stored contents. After the update is completed, the recording device 110 transmits the group of update data collectively at an arbitrary timing to the recording device 120 serving as the data transfer destination. The recording device 120 writes in the group of update data transmitted from the recording device 110 to reflect the updated contents on the recording device 120.

In the case depicted in FIG. 1, a group of update data "data vol. 1.2" is determined to be data having a high overlap rate, which leads to a selection of the nonsynchronous scheme. The data transfer processing apparatus 100, therefore, first transmits "data vol. 1.2" to the recording device 110, which sequentially writes in the "data vol. 1.2" transmitted thereto to update the stored contents. After the update is completed, the recording device 110 collectively transmits the "data vol. 1.2", which has been updated, to the recording device 120. The recording device 120 updates its stored contents with the "data vol. 1.2" transmitted thereto.

The overlap rate determined at step S101 depicted in FIG. 1 is a value that represents the rate of overlap among the addresses to which the group of data is to be written. A high address overlap rate means that access to the same block is made frequently when data are written to memory areas of the recording devices 110 and 120. Usually, in the transfer of grouped data between the recording device 110 and the recording device 120, data are transferred in blocks each including a given number of addresses. Therefore, if an overlap rate is high, a group of update data is written to the recording device 110, and then is transferred to the recording device 120 in blocks, each block including data that has been written to the recording device 110.

Methods of calculating an overlap rate are not identical and therefore, various calculating methods are available. For example, using a first calculating method, an overlap rate is calculated from a ratio of addresses to which plural data items are assigned (numerator) to the total number of data items in the group of update data (denominator), where each data item is assigned an address. In other words, the equation: "overlap rate=number of addresses to which plural data items are assigned/total number of addresses assigned for a group of update data" is obtained. Of course, if the overlap rate is to be expressed as a percentage, the above equation is multiplied by 100.

An overlap rate may be calculated using a second calculating method employing the grouping of the addresses respectively assigned to each data item in a group of update data, where the grouping is into classification groups that each encompass a range of consecutive addresses. Usually, the address spaces of the memory areas of the recording devices 110 and 120 are divided into blocks of plural addresses. The addresses of data items written to the same block are, therefore, classified into the same classification group. When the data items are transmitted from the memory area of the recording device 110 to the memory area of the recording device 120 to update the data contents thereof (i.e., to be copied), the data items are handled in blocks.

For example, when a memory area is made up of an address space 00 to FF, data transfer is performed in blocks as described below.

Address 00 to 0F: block 0
Address 10 to 1F: block 1
Address 20 to 2F: block 2
Address 30 to 3F: block 3
Address 40 to 4F: block 4
Address 50 to 5F: block 5
Address 60 to 6F: block 6
Address 70 to 7F: block 7
Address 80 to 8F: block 8
Address 90 to 9F: block 9
Address A0 to AF: block A
Address B0 to BF: block B
Address C0 to CF: block C
Address D0 to DF: block D
Address E0 to EF: block E
Address F0 to FF: block F In the second calculating method, the total overlap rate may be calculated from a ratio of the sum of addresses in each classification group (numerator) to the total number of data items in a group of update data (denominator). In other words, the equation "overlap rate=sum of addresses in each classification group/total number of addresses assigned for a group of update data" is obtained.

Using a third calculating method, an overlap rate may be calculated from the ratio of classification groups above (numerator), each having plural addresses classified thereto (the addresses being among the addresses respectively assigned to each data item in a group of update data) to the total number of classification groups (denominator), thereby yielding the equation: "overlap rate=number of classification groups having plural addresses classified thereto, the addresses being among the addresses respectively assigned to each data item in a group of update data/total number of classification groups".

In a specific example, it is assumed that a group of update data includes five items of data $\alpha$ (address 01) data $\beta$ (address 11), data $\gamma$ (address 03), data $\delta$ (address 00), and data $\epsilon$ (address 51), and that the data $\alpha$, $\gamma$, and $\delta$ are written to the block 0, the data $\beta$ to the block 1, and the data $\epsilon$ to the block 5.

Calculating an overlap rate with respect to such a group of update data using the above calculating methods brings the following result.

1) First calculating method: overlap rate=0/5
2) Second calculating method: overlap rate=3/5 (numerator value 3 represents the data $\alpha$, $\gamma$, and $\delta$)
3) Third calculating method: overlap rate=1/16 (numerator value 1 represents the block 0)

In this manner, different overlap rates result depending on the calculating method selected. A calculating method, therefore, is preferably selected according to the type of data to be handled and the setting of the address spaces of the recording devices 110 and 120 and units of blocks. When selection between the synchronous scheme and the nonsynchronous scheme is based on a calculated overlap rate, selection of the nonsynchronous scheme is preferable when the overlap rate is large, while selection of the synchronous scheme is preferable when the overlap rate is small. Thus, if a threshold is set in advance, the synchronous scheme or the nonsynchronous scheme can be selected automatically according to whether a calculated overlap rate is at least equivalent to a threshold or lower than the threshold, and the data transfer processing is performed accordingly.

FIG. 2 is a block diagram of a data transfer processing apparatus according to the embodiment. As depicted in FIG. 2, the data transfer processing apparatus 100 includes a central processing unit (CPU) 201, a read-only memory (ROM) 202, a random access memory (RAM) 203, a magnetic disc drive 204, a magnetic disc 205, a optical disc drive 206, an optical disc 207, a communication interface (I/F) 208, an input device 209, and an output device 210, connected to one another by way of a bus 200.

The CPU 201 governs overall control of the data transfer processing apparatus 100. The ROM 202 stores therein programs such as a boot program and various programs for execution of data transfer processing including a data transfer processing program. The RAM 203 is used as a work area of the CPU 201. The magnetic disc drive 204, under the control of the CPU 201, controls reading/writing of data from/to the magnetic disc 205. The magnetic disc 205 stores therein the data written under control of the magnetic disc drive 204.

The optical disc drive 206, under the control of the CPU 201, controls reading/writing of data from/to the optical disc 207. The optical disc 207 stores therein the data written under control of the optical disc drive 206, the data being read by the data transfer processing apparatus 100.

The communication I/F 208 is connected to a network 211 such as a local area network (LAN), a wide area network (WAN), and the Internet through a communication line and is connected to other apparatuses through this network 211. The communication I/F 208 administers an internal interface with the network 211 and controls the input/output of data from/to external apparatuses. For example, a modem or a LAN adaptor may be employed as the communication I/F 208.

The input device 209 receives input from an external source to the verification supporting apparatus 200. The input device 209 can specifically be a keyboard, a mouse, etc.

In the case of the keyboard, the keyboard includes, for example, keys for inputting letters, numerals, and various instructions and performs the input of data. The input device 209 may be a touch-panel-type input pad or numeric keypad, etc. In the case of a mouse, the input device 209, for example, performs the movement of the cursor, selection of a region, or movement and size change of windows. The input device 209 may be a track ball or a joy stick provided each respectively has a function similar to a pointing device.

The output device 210 outputs a history of data transfers by the verification supporting apparatus 200, a scheme selection result for each update, an updating status, etc. Specific examples of the output device 210 include a display, a printer, etc.

In the case of a display, the output device 210 displays, for example, data such as texts, images, functional information, etc., in addition to a cursor, icons, or tool boxes. A cathode ray tube (CRT), a thin-film-transistor (TFT) liquid crystal display, a plasma display, etc., may be employed as the display. In the case of a printer, the output device 210, for example, prints image data and text data. A laser printer or an ink jet printer may be employed as the printer.

FIG. 3A is a functional diagram of the data transfer processing apparatus 100. As depicted in FIG. 3A, the data transfer processing apparatus 100 includes an acquiring unit 301, a calculating unit 302, a selecting unit 303, and an executing unit 304. Respective functions of the functional units above (acquiring unit 301 to executing unit 304) are implemented, for example, by causing the CPU to execute a relevant program that is stored in a memory unit of the data transfer processing apparatus 100 or provided through an input-output I/F.

Data output from the functional units (acquiring unit 301 to executing unit 304) are saved in the memory unit. The respective functions of connection destination units indicated by an arrow in FIG. 3A are implemented by causing the CPU 201 to read, from the memory unit, data output from a connection origin unit and execute a data transfer processing program for the connection destination unit.

The acquiring unit 301 acquires a group of update data for one recording device among plural recording devices (e.g., recording devices 110 and 120). In this example, the acquiring unit 301 acquires the group of update data for the recording device 110, as depicted in FIG. 1.

The calculating unit 302 calculates an overlap rate of the addresses, based on addresses respectively set for each item of data in the group of update data acquired by the acquiring unit 301. This overlap rate of addresses may be calculated by the first to third calculating methods above, or may be calculated by another calculating method.

The selecting unit 303, based on the overlap rate calculated by the calculating unit 302, selects a data transfer scheme, either the synchronous scheme or the nonsynchronous scheme. The synchronous scheme is a data transfer scheme of transmitting the group of update data to all accessible recording devices (recording devices 110 and 120). The nonsynchronous scheme is a data transfer scheme of transmitting the group of update data to the recording device 110 first and then causing the recording device 110 to transmit the group of update data to the other recording device 120. The selecting unit 303 selects the nonsynchronous scheme when the overlap rate calculated by the calculating unit 302 exceeds a threshold, and selects the synchronous scheme when the overlap rate does not exceed the threshold.

The executing unit 304 executes the data transfer scheme selected by the selecting unit. In this manner, upon acquiring a group of update data, the data transfer processing apparatus 100 makes a selection based on an overlap rate before executing data transfer processing, thereby enabling efficient execution of data transfer processing.

Figure 3B:
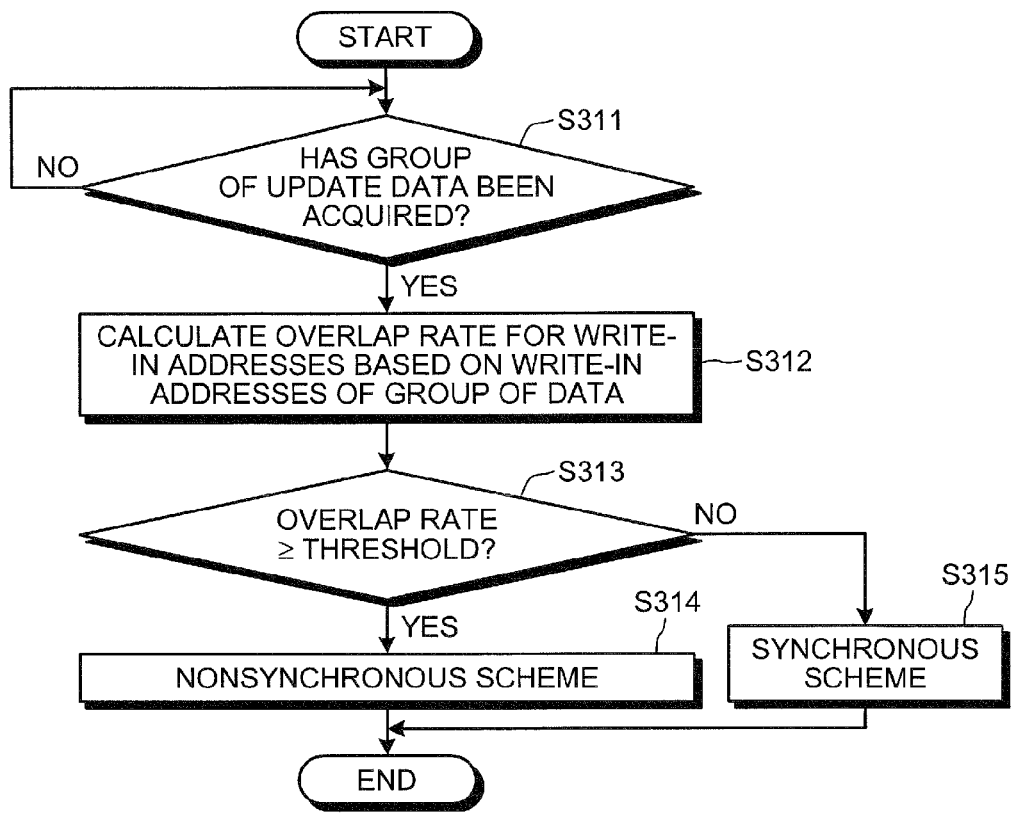
FIG. 3B is a flowchart of data transfer processing.

FIG. 3B is a flowchart of the data transfer processing. As depicted in the flowchart of FIG. 3B, whether the acquiring unit 301 has acquired a group of update data is determined (step S311), and acquisition of the group of update data by the acquiring unit 301 is waited for (step S311: NO). When the group of update data has been acquired (step S311: YES), the calculating unit 302 calculates, based on the addresses to which the group of data are to be written, an overlap rate concerning the addresses of the group of update data (step S312).

The selecting unit 303 then determines whether the overlap rate calculated at step S312 is at least equal to a threshold (step S313). The threshold used for the determination at step S313 is a threshold that is arbitrarily set in advance by a user of the data transfer processing apparatus 100 or through a higher order program. At step S313, when determining the overlap rate to be at least equal the threshold (step S313: YES), the selecting unit 303 selects the nonsynchronous scheme, and execution of the data transfer processing by the executing unit 304 follows (step S314), ending a series of the processing. When determining the overlap rate to be less than the threshold (step S313: NO), the selecting unit 303 selects the synchronous scheme, and execution of the data transfer processing by the executing unit 304 follows (step S315) ending a series of the processing.

As described above, according to the data transfer processing of the embodiment, calculating an overlap rate anew allows a system administrator to automatically select a proper data transfer scheme without relying on experience and intuition. In this manner, by referring to the overlap rate, the system administrator is able to constantly select a proper data transfer scheme without relying on conventional experience and intuition.

However, in actual application of the data transfer processing above, if the address spaces of the recording devices 110 and 120 are extensive, the calculating unit 302 may take an extremely long time for calculation. Further, with extensive address spaces, the overlapping of addresses corresponding to a group of update data becomes rare, which may lead to a case where an overlap rate cannot be calculated. Therefore, examples of configurations for efficient execution of the data transfer processing in practical cases will be described.

A process of changeover between the synchronous scheme and the nonsynchronous scheme according to the overlap rate of update data described in FIG. 1 will be described as a first example. In the first example, for efficient overlap rate calculation, a bit map is generated by converting the address spaces of the recording devices 110 and 120 into bit map format data and an overlap rate is calculated using this bit map.

Figure 4:
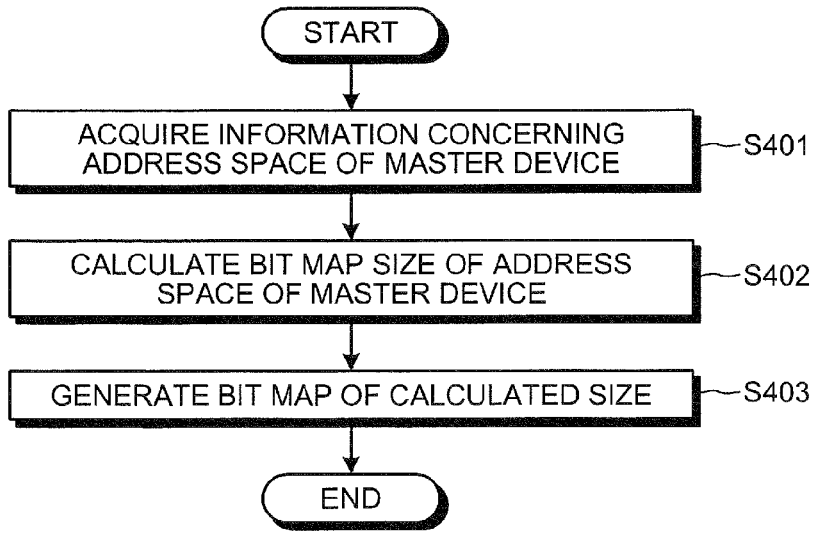
FIG. 4 is a flowchart of a bit map generating process.

In the first example, the data transfer processing apparatus 100 includes a bit map generating functional unit that generates a bit map. FIG. 4 is a flowchart of the bit map generating process. As depicted in the flowchart of FIG. 4, address space information for the master device 110 is acquired (step S401). Subsequently, the bit map size of the address space of the master device 110 is calculated from the address space information acquired at step S401 (step S402). Then, a bit map of the size calculated at step S402 is generated (step S403). A bit map generated by such a procedure is used to calculate the overlap rate of update data.

Calculation of the bit map size at step S402 will be described in detail. When the total capacity of the address space of memory area of the recording device 110 is a [TB] and the size of a block at the time of executing the data transfer processing is b [MB], the total number of blocks is defined as: total number of blocks=a [TB]/b [MB]=c [M]. This means that the total number of bits of the bit map is c [M bit]. If the total number of bits of the bit map is divided by 8 to calculate the bit map size in terms of bytes, the bit map size=c [M bit]/8 [bit/B]=d (MB). It is preferable that at least a bit map having this bit map size be recorded in the data transfer processing apparatus 100.

Figure 5:
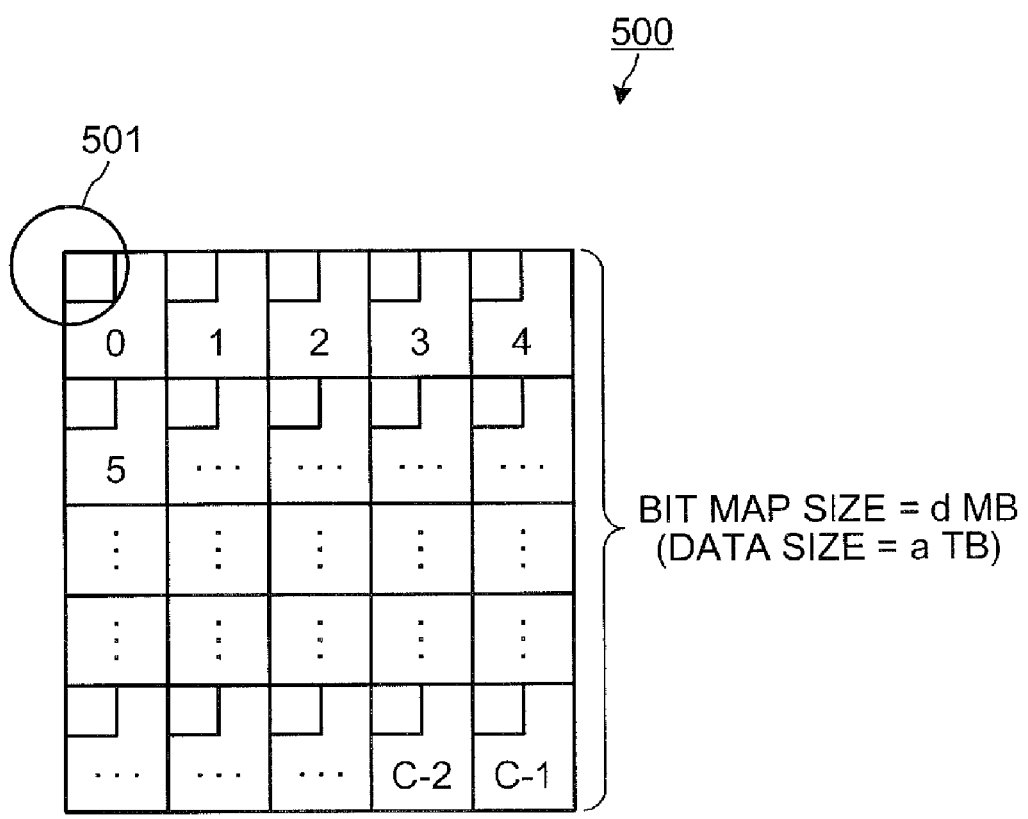
FIG. 5 is a view of an example of a bit map used for overlap rate calculation.

FIG. 5 is a view of an example of a bit map used for overlap rate calculation. A bit map 500 depicted in FIG. 5 is an example of the bit map generated by the process at step S403 of the flowchart depicted FIG. 4. The bit map 500 is divided into c blocks including a block 0 to a block c-1. As described previously, these c blocks are equivalent to groups resulting from dividing an address space by each group of given number of addresses.

Each block of the bit map 500 is provided with an overlap flag memory 501 (1 bit). In the overlap flag memory 501, a flag is raised when plural items of data are written into the same block. This flag may be used as a counting trigger for an overlap counter j described hereinafter.

Figure 6:
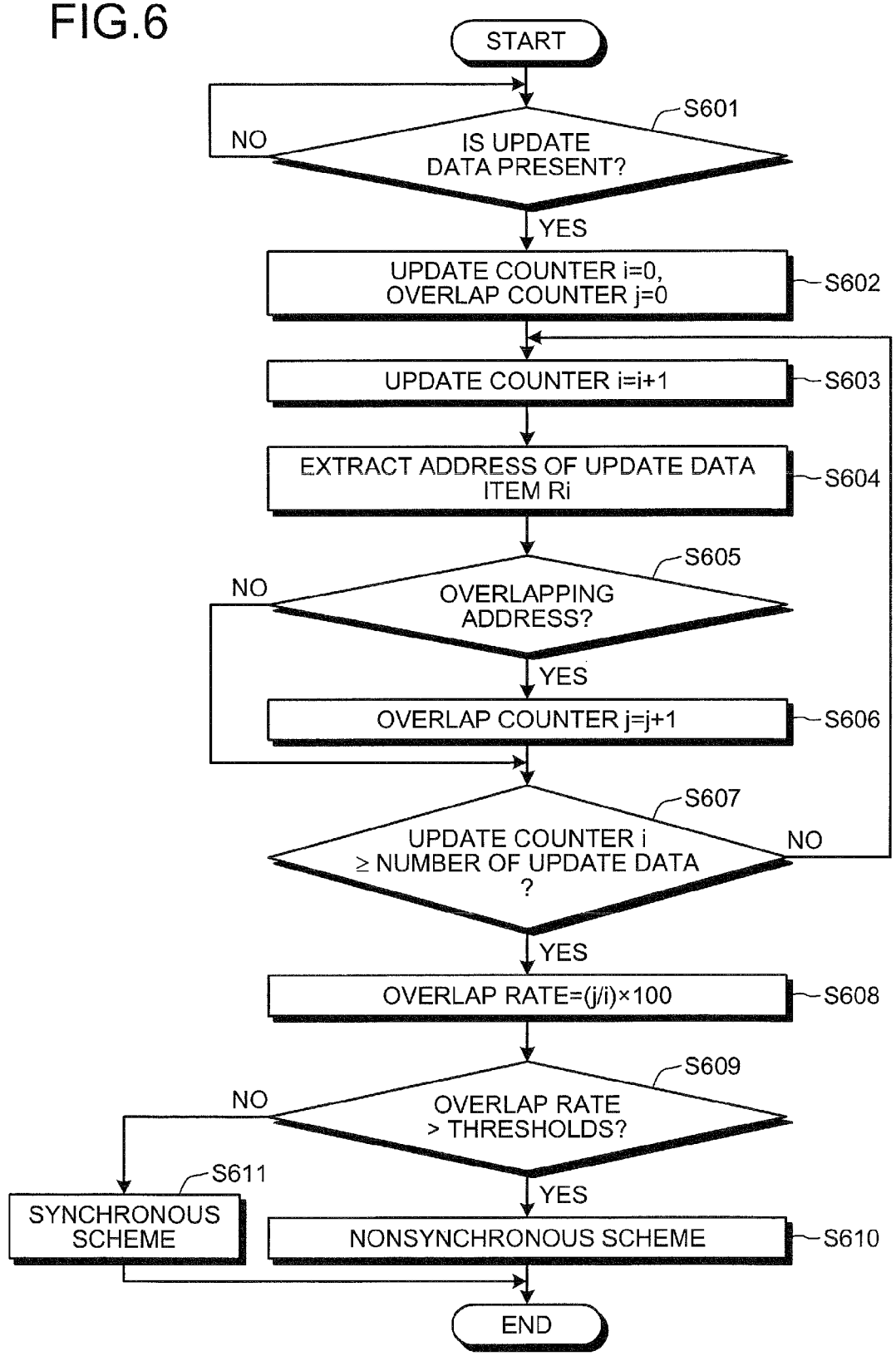
FIG. 6 is a flowchart of a procedure of selecting a data transfer processing scheme.

FIG. 6 is a flowchart of processes for selecting a data transfer processing scheme. As depicted in the flowchart of FIG. 6, whether update data is present is determined (step S601), and a determination of the presence of the update data is waited for (step S601: NO). When a determination is made that the update data is present (step S601: YES), an update counter i and the overlap counter j are each reset to 0 (step S602).

To mirror the update data, the presence of which is determined at step S601, the update counter i is incremented (step S603) and the address of an update data item Ri is extracted (step S604). Whether the address extracted at step S604 is an overlapping address overlapping the address of another update data item Ri is determined (step S605). At step S605, determination can be easily made when a flag has already been raised in the overlap flag memory 501 of the bit map 500.

When the extracted address is determined to be an overlapping address at step S605 (step S605: YES), the overlap counter j is incremented (step S606). Subsequently, whether the value of the update counter i is at least equal to the number of update data items E is determined (step S607). When the value of the update counter i is less than the number of update data items E (step S607: NO), processing returns to step S603, at which determination is made concerning the overlapping of the address of the next update data item Ri. When the extracted address is determined not to be an overlapping address at step S605 (step S605: NO), the process at step S606 is skipped and processing proceeds to step S607.

When a determination is made that the value of the update counter i has become at least equal to the number of update data items E (step S607: YES), an overlap rate is calculated (step S608). The overlap rate is calculated by an overlap rate calculating method using the equation: overlap rate=overlap counter j/update counter i×100%. This calculation method yields an overlap rate that corresponds to the number of update data items having overlapping addresses among the total number of addresses set for the group of update data.

When the overlap rate is calculated at step S608, whether the overlap rate is greater than a preset threshold S is determined (step S609). When the overlap rate is determined to be greater than the threshold S (step S609: YES), update data transfer processing using the nonsynchronous scheme is selected (step S610), and a series of the selection processing is ended. When the overlap rate is determined not to be greater than the threshold S at step S 609 (step S609: NO), an update data transfer processing using the synchronous scheme is selected (step S611), and the series of selection processes are ended.

Figure 7:
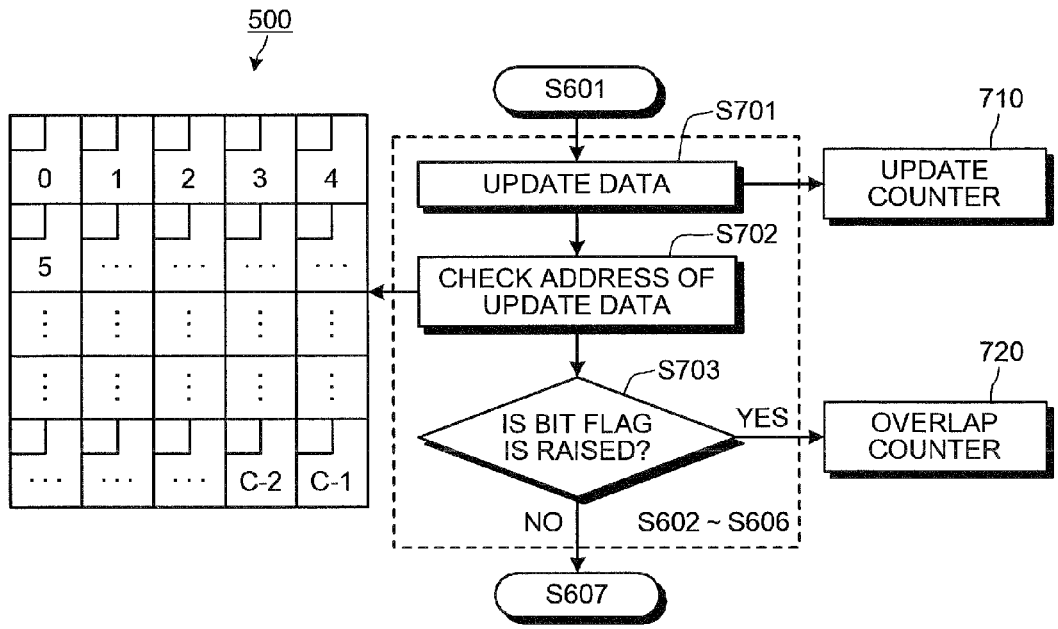
FIG. 7 is a schematic of a counter used in calculation of an overlap rate.

FIG. 7 is a schematic of a counter used in calculation of an overlap rate. A depicted in FIG. 6, in the first example, the data transfer processing apparatus 100 includes an update counter 710 that counts the total data number of addresses in a group of update data, and an overlap counter 720 that counts overlapping addresses, addresses to which data has already been written and data is again written.

As depicted in the flowchart of FIG. 7, when an update data item is read in following the process at step S601 (step S701), a count instruction is output to the update counter 710. The address of the update data item is checked by referring to the bit map 500 (step S702) to determine whether a bit flag is raised (step S703). When the bit flag is raised (step S703: YES), a count instruction is output to the overlap counter 720. When the bit flag is not raised (step S703: NO), the processing proceeds to step S607. Through the processing above, an overlap rate is yielded by the equation: overlap rate=(j/i)× 100%, where i is the value of the update counter 710 and j is the value of the overlap counter 720. The calculating method used in this procedure is equivalent to the second calculating method described in the description of the scheme of the data transfer processing.

An overlap rate may be calculated by the third calculating method using the bit map 500. In this case, a ratio of the number of blocks having raised a flag in the overlap flag memory 501 (blocks 0, 3, etc., in the case of FIG. 7) among the total number of blocks C constituting the bit map 500 is equivalent to the overlap rate. Therefore, overlap rate=(number of blocks having raised flags/C)×100%.

In the flowchart depicted in FIG. 6, the address of each update data item is checked, and subsequently the overlap rate is calculated. However, if the volume of the update data is large, the processing loop at step S607 takes a long time. For this reason, the processing may proceed to the overlap rate calculation processing at a point when a given number (or more) of the addresses of data items have been checked among the total number of update data items, or after a given period of time has elapsed.

As described above, when the address space of the recording device 110 is extensive, the size of the bit map size is correspondingly greater, leading to a longer processing time. In the first example, processing time is reduced using plural bit maps.

Figure 8:
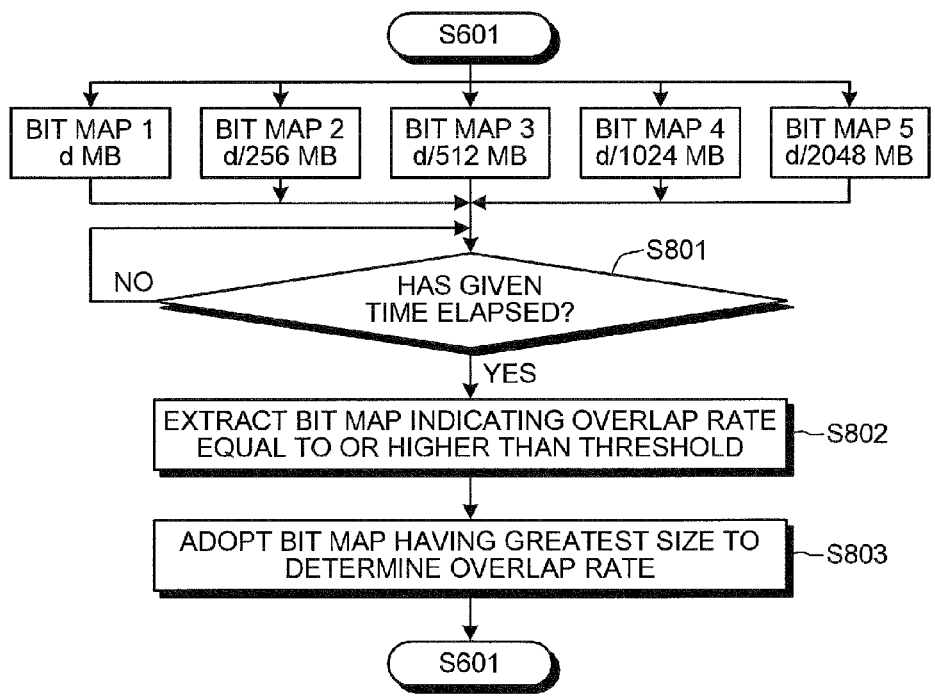
FIG. 8 is a flowchart of a procedure of selecting a data transfer processing scheme using a plurality of bit maps.

FIG. 8 is a flowchart of a procedure of selecting a data transfer processing scheme using a plurality of bit maps. In the case of the flowchart depicted in FIG. 8, the processes at steps S602 to S607 are performed using plural bit maps, including bit maps 1 to 5. Among the bit maps, the bit map 1 is equivalent to the bit map 500 depicted in FIG. 5, and other bit maps 2 to 5 are generated using the hash value of each of the blocks constituting the bit map 1.

The hash value of each block is, for example, a value that corresponds to the lower 6-digit of a hexadecimal 8-digit address. Reducing a hexadecimal 8-digit address to an address expressed by the lower 6-digit means that both FFFF0001 and 0FFF001 are handled as the same address. The bit map size, therefore, is reduced.

Thus, given different hash values, the sizes of the bit maps 2 to 5 are reduced to 1/256 [MB], 1/512 [MB], 1/1024 [MB], and 1/2048 [MB], respectively, relative to the size of the bit map 1 of 1 [MB]. Because of a reduction in the size of the bit map, more addresses are included in the same block, which results in more frequent counting at the overlap counter.

Overlapping values are calculated in parallel using the bit maps 1 to 5, and whether a given time has elapsed is determined (step S801). The passage of the given time is waited for (step S801: NO). When the given time has elapsed (S801: YES), a bit map indicating an overlap rate equal to or greater than a threshold is extracted (step S802). The threshold used as a determination criterion is different from the threshold S used at step S609, and is used to determine whether a calculated overlap rate has a value that can be used as an effective overlap rate. Specifically, when an address space is enormous, an overlap rate of a too small of a value cannot be compared with the threshold S and such an overlap rate can be deleted at step S802.

Among bit maps extracted at step S802, a bit map having the greatest size is adopted for determining an overlap rate (step S803), and the processing proceeds to step S609. In this manner, by calculating overlap rates in parallel using plural bit maps, the time required for overlap rate calculation can be reduced to be within a given time. Thus, through a reduction in processing time, the data transfer processing can be executed within a time period estimated by a system administrator.

Data transfer processing in a case of addition of a new synchronous scheme will be described as a second example. In the first example above, the synchronous scheme and the nonsynchronous scheme are interchanged according to the overlap rate of the updated contents of update data to realize efficient data transfer.

In general, however, the contents of update data often change as time passes. In such a case, an updating pattern or the overlap rate of update-addresses may change in the middle of the data transfer processing even if an optimum scheme is selected. In the case of the first example, once the data transfer processing commences in either of the schemes as a selected scheme, the operation must be performed to the end according the selected scheme. To change the transfer scheme in such a case, a program of the data transfer processing apparatus 100 needs to be stopped temporarily to restart data transfer work from scratch.

When the nonsynchronous scheme is adopted, data copying for data transfer may not be able to catch up with data updating due to a transaction. This situation may occur because even if the nonsynchronous scheme is selected in advance based on the volume of update data, additional data is generated during data transfer to increase the volume of the update data. In this case, to restart data transfer work from scratch in the synchronous scheme, the program of the data transfer processing apparatus 100 must be stopped temporarily.

In the second example, the data transfer processing apparatus 100 has an additional function of generating a new bit map based on update-addresses in a not-yet copied area of a transfer destination among the addresses of the update data items. Based on the new bit map, the data transfer processing apparatus 100 executes, in background processing, a process of copying data in the not-yet copied area to the recording device 120 serving as the transfer destination. Such a data transfer scheme of the second example is referred to as a "new synchronous scheme".

Figure 9:
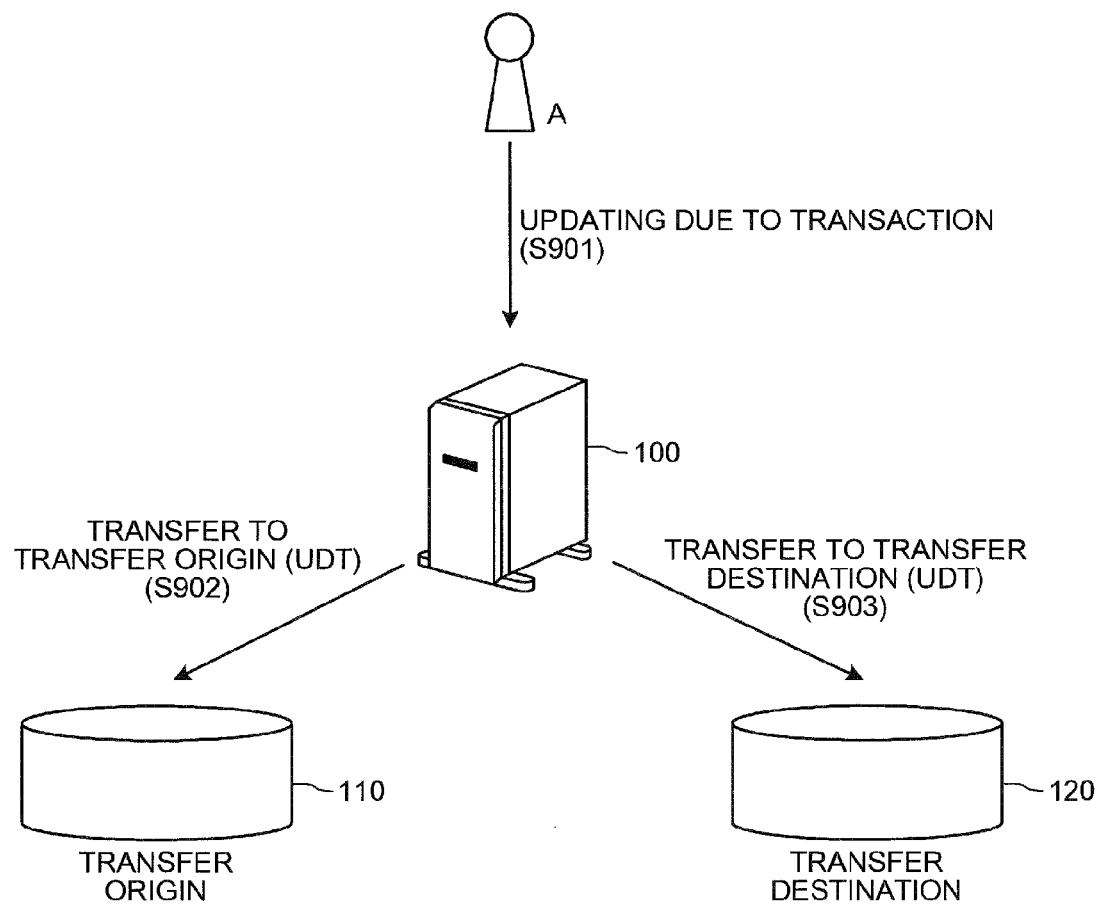
FIG. 9 is a view of a synchronous scheme.

The synchronous scheme, the nonsynchronous scheme, and the new synchronous scheme will be described with reference to FIGS. 9 to 11 to compare the processing of the second example with that of the first example. FIG. 9 is a view of the synchronous scheme. As depicted in FIG. 9, when a system administrator A, due to a transaction, gives an instruction to update (step S901), the data transfer processing apparatus 100 mirrors the updating on the transfer origin recording device 110 and on the transfer destination recording device 120 (steps S902 and S903). The operation at steps S902 and S903 is referred to as updating thread (UDT).

Figure 10:
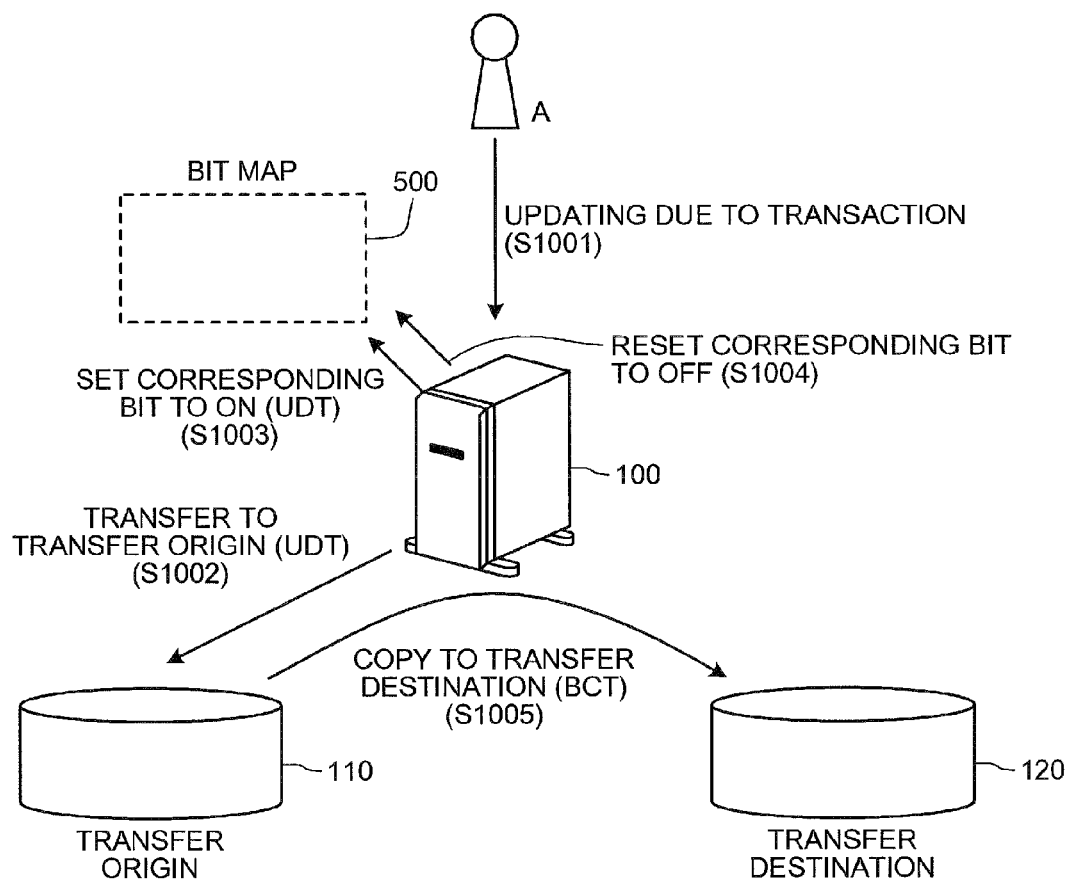
FIG. 10 is a view of a nonsynchronous scheme.

FIG. 10 is a view of the nonsynchronous scheme. As depicted in FIG. 10, when the system administrator A, due to a transaction, gives an instruction to update (step S1001), the data transfer processing apparatus 100 mirrors the updating on the transfer origin recording device 110 (step S1002). The data transfer processing apparatus 100 then sets a bit corresponding to the updating on the bit map 500 to ON to clearly indicate the updating position (step S1003).

Subsequently, the data transfer processing apparatus 100 resets the bit set to ON at step S1003 to OFF (step S1004), and instructs the transfer origin recording device 110 to copy updated contents to the transfer destination recording device 120 (step S1005). The operation at steps S1003, S1004, and S1005 is referred to as background copy thread (BCT).

Figure 11:
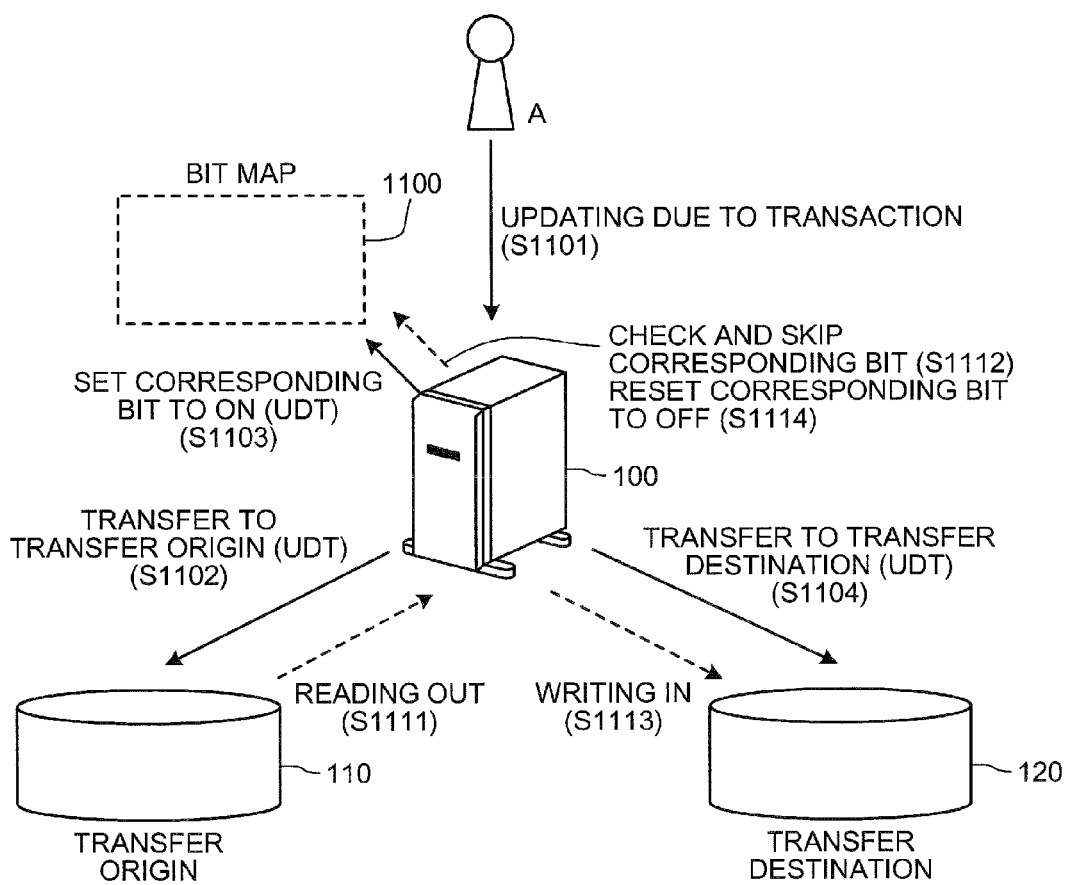
FIG. 11 is a view of a new synchronous scheme.

FIG. 11 is a view of the new synchronous scheme, which exceptionally permits the function at step S1002 originally exerted only in the nonsynchronous scheme to be exerted further in the synchronous scheme. In this configuration, the synchronous scheme and the nonsynchronous scheme can be interchanged dynamically and instantly during data transfer processing. In FIG. 11, operations denoted by continuous line arrows are equivalent to the updating thread, and operations denoted by broken line arrows are equivalent to the background copy thread.

As depicted in FIG. 11, the thread of copying update data to the transfer destination recording device 120 in background processing is referred to as BCT, and the thread of writing update data to the transfer origin recording device 110 at data updating is referred to as UDT. When the system administrator A, due to a transaction, gives an instruction to update (step S1101), data transfer commences in a scheme corresponding to the overlap rate. When the nonsynchronous scheme is selected in the new synchronous scheme, in the UDT, update data is written to the transfer origin recording device 110 (step S1102) and, at the same time, a bit corresponding to the update data on a new bit map 1100 is set to ON (step S1103).

In the BCT, updated contents are read in from the recording device 110 (step S1111), and check & skipping is performed on a bit on the bit map 1100 and corresponding to the updated contents (step S1112). At step S1112, specifically, the bit map 1100 is scanned for an ON-bit. When an ON-bit is present, the ON-bit is reset to an OFF-bit and, at the same time, updated contents of the transfer origin recording device 110 that corresponds to the ON-bit is written to the transfer destination recording device 120, mirroring the updated contents (step S1113).

To ensure that update data written to the transfer origin recording device 110 by the UDT is copied to the transfer destination recording device 120 by the BCT, in the UDT, a bit corresponding to update data is set to ON after the update data has been written, and, in the BCT, the corresponding data is reset to OFF immediately before update data is read from the transfer origin recording device.

When the synchronous scheme is selected in the new synchronous scheme, in the UDT, update data is transferred and written to the transfer origin recording device 110 (step S1102) and, at the same time, the same update data is transferred to the transfer destination recording device 120 (step S1104). To prevent inconsistency between the updating result at the transfer origin recording device 110 and the updating result at the transfer destination recording device 120, when updating in the same block, plural updating requests are not issued simultaneously and control is made to match the sequence of updating at the transfer origin recording device 110 and the sequence of updating at the transfer destination recording device 120.

If a change in the transfer scheme from the nonsynchronous scheme to the synchronous scheme is not allowed by specification restriction until no not-yet copied areas of the transfer origin recording device 110 remain, in a state when copying by the BCT cannot catch up with updating by the UDT, short of waiting for a time when less updating occurs, such as at night, the transfer scheme cannot be interchanged. Thus, even in the synchronous scheme, continuous operation of the BCT in the same manner as in the nonsynchronous scheme is permitted exceptionally so that even if the transfer scheme is changed from the nonsynchronous scheme to the synchronous scheme when not-yet copied areas still remain, such a specification poses no problem.

In the synchronous scheme in which the BCT is active, a measure is taken to prevent a situation where the latest copy by the UDT is overwritten with a copy by the BCT based on old data. Specifically, in the UDT, before data is transferred to the transfer destination recording device, a bit corresponding to the data on the updating bit map is checked, and when the bit is ON, the bit is reset to OFF. In the BCT, data is read from the transfer origin recording device based on the updating bit map, and a bit corresponding to the data on the updating bit map is checked again after data read-in. When the corresponding bit is already reset to OFF, data writing to the transfer destination recording device is skipped.

To simplify design, concerning the timing of transfer scheme changeover between the synchronous scheme and the nonsynchronous scheme, the BCT process in progress is to be completed by the time of the transfer scheme changeover, thereby preventing the BCT active in the synchronous scheme and the BCT active in the nonsynchronous scheme from overlapping each other.

As described above, the new synchronous scheme is set so that the data transfer processing is executed without failure regardless of whether the BCT is active in the nonsynchronous scheme or in the synchronous scheme. The system administrator A, therefore, is allowed to automatically change the data transfer scheme dynamically and instantly. In the new synchronous scheme, the number of ON-bits on the updating bit map decrease monotonically. If a situation arises where copying by the BCT cannot catch up with updating by the UDT in the nonsynchronous scheme, the data transfer scheme is changed to the synchronous scheme and the elapse of a given period is waited for so that updating is performed without a delay to mirror data correctly.

In this manner, in the second example, update data is transmitted in the new synchronous scheme that allows the synchronous scheme and the nonsynchronous scheme to be interchanged dynamically and instantly during data transfer processing. In the new synchronous scheme, the system administrator is able to continue data transfer while constantly selecting an optimum scheme corresponding to a transaction updating pattern without stopping a data transfer tool. As a result, the system administrator is able to suppress the effect on transactions to a minimum and realize efficient update data transfer processing.

As described above, according to the embodiment, an optimum data transfer scheme is selected and executed according to the contents of a group of update data, as described in the first example. In the second example, even when the data volume of a group of update data changes dynamically, an efficient data transfer processing can be performed constantly without stopping on-going processing.

The data transfer processing method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The data transfer processing apparatus 100 described in the present embodiment can be realized by an application specific integrated circuit (ASIC) such as a standard cell or a structured ASIC, or a programmable logic device (PLD) such as a field-programmable gate array (FPGA). Specifically, for example, the functional units (acquiring unit 601 to executing unit 604) of the data transfer processing apparatus 100 are defined in hardware description language (HDL), which is logically synthesized and applied to the ASIC, the PLD, etc., thereby enabling manufacture of the data transfer processing apparatus 100.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer-readable recording medium storing therein a data transfer processing program that causes a computer capable of accessing a plurality of recording devices to execute:
   acquiring a group of update data for a first recording device of the plurality of recording devices;
   calculating, based on addresses to which the group of data is to be written and that are respectively assigned to each data item in the group of update data, an overlap rate of the addresses;
   selecting, based on the overlap rate calculated at the calculating, a data transfer scheme from among a synchronous scheme of transmitting the group of update data simultaneously to the first recording device and a second recording device, or a nonsynchronous scheme of transmitting the group of update data to the first recording device and subsequently causing the first recording device to transmit the group of update data to the second recording device; and
   executing the data transfer scheme selected at the selecting.

2. The non-transitory computer-readable recording medium according to claim 1, wherein:
   the calculating includes calculating the overlap rate based on a ratio of addresses to which plural data items are assigned with respect to a total number of data items in the group of update data, with each data item being assigned an address.

3. The non-transitory computer-readable recording medium according to claim 1, wherein:
   the addresses respectively assigned to each data item of the group of update data are classified into classification groups that each encompass a range of consecutive addresses, and
   the calculating includes calculating the overlap rate based on a ratio of a sum of the addresses classified into each classification group into which the addresses of plural data items are classified to a total number of addresses assigned for the group of update data.

4. The non-transitory computer-readable recording medium according to claim 1, wherein:
   the addresses respectively assigned to each data item of the group of update data are classified into classification groups that each encompass a range of consecutive addresses, and
   the calculating includes calculating the overlap rate based on a ratio of the classification groups into which a plurality of the addresses are classified to a total number of the classification groups.

5. The non-transitory computer-readable recording medium according to claim 1, wherein:
   the selecting includes selecting the nonsynchronous scheme when the overlap rate is equal to or greater than a threshold, and selecting the synchronous scheme when the overlap rate is lower than the threshold.

6. A non-transitory computer-readable recording medium storing therein a data transfer processing program that causes a computer capable of accessing a plurality of recording devices to execute:
   acquiring a group of update data for a first recording device of the plurality of recording devices;
   calculating, based on addresses respectively assigned to each data item in the group of update data, an overlap rate of the addresses;
   selecting, based on the overlap rate calculated at the calculating, a data transfer scheme from among a synchronous scheme of transmitting the group of update data simultaneously to the first recording device and a second recording device, or a nonsynchronous scheme of transmitting the group of update data to the first recording device and subsequently causing the first recording device to transmit the group of update data to the second recording device;

executing the data transfer scheme selected at the selecting; and wherein the calculating includes converting an address space of the first recording device into a bit map, and calculating the overlap rate based on a rate of the addresses respectively assigned to the data items in the group of update data on the bit map.

7. The non-transitory computer-readable recording medium according to claim 6, further comprising generating newly a second bit map by converting an address space of the first recording device into a bit map, wherein:

the executing includes recording on the second bit map, a state of transmission of the group of update data to the first recording device, and when at the selecting, a data transfer scheme is re-selected during execution of a process of transferring the group of update data, the executing further includes executing, based on a transmission state on the second bit map, the data transfer scheme newly selected.

8. A non-transitory computer-readable recording medium storing therein a data transfer processing program that causes a computer capable of accessing a plurality of recording devices to execute:

acquiring a group of update data for a first recording device of the plurality of recording devices;

calculating, based on addresses respectively assigned to each data item in the group of update data, an overlap rate of the addresses;

selecting, based on the overlap rate calculated at the calculating, a data transfer scheme from among a synchronous scheme of transmitting the group of update data simultaneously to the first recording device and a second recording device, or a nonsynchronous scheme of transmitting the group of update data to the first recording device and subsequently causing the first recording device to transmit the group of update data to the second recording device;

executing the data transfer scheme selected at the selecting; and wherein the calculating includes converting, into a hash value, each of the addresses respectively assigned to the data items in the group of update data.

9. The non-transitory computer-readable recording medium according to claim 8, wherein:

the calculating includes converting the hash value into information in a bit map format when a size of an address space of the first recording device is equal to or greater than a threshold.

10. A non transitory data transfer processing apparatus capable of accessing a plurality of recording devices, the data transfer process apparatus comprising:

an acquiring unit that acquires a group of update data for a first recording device of the plurality of recording devices;

a calculating unit that, based on addresses to which the group of data is to be written and that are respectively assigned to each data item in the group of update data, calculates an overlap rate of the addresses;

a selecting unit that based on the overlap rate calculated by the calculating unit, selects a data transfer scheme from among a synchronous scheme of transmitting the group of update data simultaneously to the first recording device and a second recording device, or a nonsynchronous scheme of transmitting the group of update data to the first recording device and subsequently causing the first recording device to transmit the group of update data to the second recording device; and an executing unit that executes the data transfer scheme selected by the selecting unit.

11. A data transfer processing method of a computer capable of accessing a plurality of recording devices, the data transfer processing method comprising:

acquiring a group of update data for a first recording device of the plurality of recording devices;

calculating, based on addresses to which the group of data is to be written and that are respectively assigned to each data item in the group of update data, an overlap rate of the addresses;

selecting, based on the overlap rate calculated at the calculating, a data transfer scheme from among a synchronous scheme of transmitting the group of update data simultaneously to the first recording device and a second recording device, or a nonsynchronous scheme of transmitting the group of update data to the first recording device and subsequently causing the first recording device to transmit the group of update data to the second recording device; and executing the data transfer scheme selected at the selecting.

* * * * *

UNITED STATES PATENT AND TRADEMARK OFFICE
CERTIFICATE OF CORRECTION

| | | |
|---|---|---|
| PATENT NO. | : 8,229,995 B2 | |
| APPLICATION NO. | : 12/353838 | |
| DATED | : July 24, 2012 | |
| INVENTOR(S) | : Takeshi Miyamae | |

It is certified that error appears in the above-identified patent and that said Letters Patent is hereby corrected as shown below:

In the Claims:

Column 16, line 5, before the phrase "data transfer" delete "non transitory".

Signed and Sealed this
Twelfth Day of November, 2013

Teresa Stanek Rea
*Deputy Director of the United States Patent and Trademark Office*